US006766843B2

(12) United States Patent
Hilt et al.

(10) Patent No.: US 6,766,843 B2
(45) Date of Patent: Jul. 27, 2004

(54) APPARATUS FOR TRANSFERRING A DISCRETE PORTION OF FIRST WEB ONTO A SECOND WEB

(75) Inventors: Ronald Alex Hilt, Oshkosh, WI (US); Randy Keith Burr, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/355,337

(22) Filed: Jan. 30, 2003

(65) Prior Publication Data

US 2003/0111184 A1 Jun. 19, 2003

Related U.S. Application Data

(62) Division of application No. 09/520,692, filed on Mar. 7, 2000, now Pat. No. 6,550,517.

(51) Int. Cl.[7] .......................... B32B 31/00; B32B 31/04

(52) U.S. Cl. ........................ 156/557; 156/519; 156/540; 156/552

(58) Field of Search ................................. 156/264, 265, 156/285, 519, 521, 552, 362, 557, 556, 566, 540, 543, 516, 517, 229

(56) References Cited

U.S. PATENT DOCUMENTS

| | | | |
|---|---|---|---|
| 3,957,570 | A | 5/1976 | Helm |
| 4,364,787 | A | 12/1982 | Radzins |
| 4,642,150 | A | 2/1987 | Stemmler |
| 4,726,876 | A | 2/1988 | Tomsovic, Jr. |
| 4,925,520 | A | 5/1990 | Beaudoin et al. |
| 5,041,073 | A | 8/1991 | Eicker |
| 5,102,486 | A | 4/1992 | Midgley et al. |
| 5,200,020 | A | 4/1993 | Collins et al. |
| 5,224,405 | A | 7/1993 | Pohjola |
| 5,296,080 | A | 3/1994 | Merkatoris et al. |

(List continued on next page.)

FOREIGN PATENT DOCUMENTS

EP 0 764 603 A1 3/1997

OTHER PUBLICATIONS

US 4,909,885, 3/1990, Swenson (withdrawn)

*Primary Examiner*—Sue A. Purvis
(74) *Attorney, Agent, or Firm*—Scott A. Baum; Thomas J. Connelly

(57) ABSTRACT

This invention relates to an apparatus for transferring a discrete portion of a first web traveling at a first speed onto a second web traveling a second speed. The apparatus includes a converting mechanism capable of forming at least one discrete portion out of the first web. An anvil roll is positioned in close proximity to the converting mechanism and can travel at a rotational speed equal to the first speed. The anvil roll is a vacuum roll that is capable of directing the discrete portion away from the converting mechanism. A transfer roll is arranged in close proximity to the anvil roll and initially travels at a rotational speed equal to the first speed. The transfer roll forms a gap with the anvil roll through which the discrete portion can pass. The transfer roll is also a vacuum roll that is capable of directing the discrete portion away from the anvil roll. The transfer roll is capable of changing rotational speed to match the second speed during a single revolution. A backing roll is arranged in close proximity to the transfer roll and travels at a rotational speed equal to the second speed. The backing roll cooperates with the transfer roll to combine the discrete portion with the second web.

14 Claims, 7 Drawing Sheets

U.S. PATENT DOCUMENTS

| | | | |
|---|---|---|---|
| 5,308,345 A | | 5/1994 | Herrin |
| 5,380,381 A | | 1/1995 | Otruba |
| 5,407,513 A | | 4/1995 | Hayden et al. |
| 5,415,716 A | | 5/1995 | Kendall |
| 5,457,939 A | | 10/1995 | Bardou et al. |
| 5,540,796 A | | 7/1996 | Fries |
| 5,545,285 A | | 8/1996 | Johnson |
| 5,556,504 A | | 9/1996 | Rajala et al. |
| 5,746,869 A | | 5/1998 | Hayden et al. |
| 5,876,163 A | | 3/1999 | Nemeth et al. |
| 5,938,944 A | | 8/1999 | Baughman et al. |
| 6,022,443 A | | 2/2000 | Rajala et al. |
| 6,047,642 A | | 4/2000 | Hunkeler |
| 6,069,294 A | | 5/2000 | Leclercq et al. |
| 6,086,694 A | | 7/2000 | Winter et al. |
| 6,098,557 A | | 8/2000 | Couillard et al. |
| 6,149,755 A | | 11/2000 | McNichols et al. |
| 6,165,306 A | * | 12/2000 | Rajala ........................ 156/263 |
| 6,250,357 B1 | | 6/2001 | Niedermeyer |
| 6,450,321 B1 | | 9/2002 | Blumenthal et al. |
| 6,550,517 B1 | | 4/2003 | Hilt et al. |

* cited by examiner

APPARATUS FOR TRANSFERRING A DISCRETE PORTION OF FIRST WEB ONTO A SECOND WEB

This application is a divisional of application Ser. No. 09/520,692 entitled APPARATUS FOR TRANSFERRING A DISCRETE PORTION OF A FIRST WEB ONTO A SECOND WEB and filed in the U.S. Patent and Trademark Office on Mar. 7, 2000 now U.S. Pat. No. 6,550,517. The entirety of application Ser. No. 09/520,692 is hereby incorporated by reference.

FIELD OF THE INVENTION

This invention relates to an apparatus for transferring a discrete portion of a first web onto a second web. More particularly, this invention relates to an apparatus for transferring a discrete portion of a first web onto a second web even when the first and second webs are traveling at different speeds.

BACKGROUND OF THE INVENTION

In today's consumer market, there are numerous types of products which require that a discrete portion of a first web be transferred, aligned and/or attached to a second web to make a composite article. Many times, the first and second webs are traveling at different speeds and the transfer has to take place at high speeds. Disposable absorbent articles, such as diapers, training pants, sanitary napkins, pantyliners and incontinence products, including undergarments, briefs, pants and pads, are representative products which rely on the merging of discrete portions of one web with a second continuous web. Many times, it is necessary to transfer, align and/or attach a discrete portion of a first web to a second web at speeds exceeding 100 feet per minute (3048 cm/min.). The attachment of a discrete portion of a first web onto a second web can be by various means including an adhesive, a mechanical connection, by forming a bond using heat and/or pressure, by forming an ultrasonic bond, etc. Hot or cold melt adhesives and ultrasonic bonds are the most commonly used forms of attachment.

Some disposable absorbent articles, such as sanitary napkins and incontinence pads, also rely on a garment attachment adhesive to secure the article to the inside surface of the user's undergarment. The garment attachment adhesive can be applied to the bottom surface of the article and is normally covered by a releasable liner or backing material. The releasable liner will prevent the garment attachment adhesive from becoming contaminated prior to use. Prior to use of the article, the consumer will remove the releasable liner. The mating of the releasable liner to the article is another example where a discrete portion of a first web needs to be brought into registration and alignment with a second web.

Many articles found in today's retail outlets, supermarkets and grocery stores require a label that notifies the consumer of the product inside the container or package. The label can provide useful information to the ultimate consumer. Some labels are required by law to provide a description of the ingredients or to ensure the consumer that the product has not been previously opened. Many such labels are secured to an outside surface of the container or package using an adhesive. Many other kinds of labels, such as mailing labels, name tags, etc. need to be adhered to the container or package just prior to shipment. Most of these labels are adhered to an outer surface of the container or package by an adhesive or glue. Attachment of such labels by high-speed equipment can utilize the present invention.

It should be noted that the list of items requiring a discrete portion of a first web, layer of material or composite member to be brought into contact and perhaps be secured to a second web is endless. Consumer goods of all kind can possibly take advantage of the present invention. The discrete portion, which can be transferred to a second web, can be made of almost any kind of material.

The production machinery for attaching a discrete portion of a first web to a second web can generally be described as an apparatus having a cutting mechanism and various rolls or rollers. Typically, the first web is a continuous roll of material that is advanced to a converting mechanism. One or more feed rolls may be used to advance the first web. The speed of the feed rolls determines the speed at which the first web is supplied to the converting mechanism. The converting mechanism can be a cutter capable of slitting, cutting or severing a discrete portion from the first web. The discrete portion will have a desired shape and size. In many cases, the cutting is performed as the first web is advanced through a nip formed by a rotary knife that comes into close proximity or contact with an anvil or backup roll. The discrete portion of the first web is then carried via various rolls, typically vacuum rolls, to a location where the discrete portion can be transferred to the second web.

In general, such converting mechanisms and transfer rolls are designed to operate at a constant speed to cut a particular size discrete portion from a first web and transfer it to a second web. Mechanical mechanisms such as gears, belts and chains are conventionally used to synchronize the first web, the cutting mechanism, the transport rolls and the second web.

When the dimensions of the discrete portion are changed, it is generally required to change some of the components of the converting mechanism and transfer rolls. With each component change, large amounts of money can be lost due to the downtime required to make the change, in addition to the capital invested in multiple grade change components.

One method used to avoid having to reengineer the machinery for each change made to the product is to run the apparatus at different speeds depending on the size of the discrete portion needed to be transferred to the second web. For example, if a longer discrete portion is needed, the rate at which the first web is advanced to the converting mechanism is increased. However, by increasing the speed of the first web, the transfer of the discrete portion onto the second web will no longer occur at the same speed and/or at the desired interval.

When two webs of materials are joined at different speeds, there is a tendency for the materials to experience shock loads, pulling, wrinkles and gaps. In most applications, joining two webs traveling at different speeds can have drastic effects on a fast moving, continuous process. Another problem caused by mismatched web speeds is that as the discrete portion of the first web contacts the second web, a jarring or shocking action may occur. This action can cause at least one of the webs to rip, tear, or wrinkle. A torn web generally requires stopping the machine and rethreading the incoming web around the guide rolls and through the various nips. In a worst case scenario, the machine may be damaged and certain parts may need to be repaired and/or replaced.

There have been a vast number of attempts made at bringing together two webs traveling at the same or at different speeds, and combining them to provide a single combined web. To date, most methods lack full acceptance for one or more reasons.

Now an apparatus has been invented which allows a discrete portion of a first web traveling at a first speed to be successfully transferred to a second web that is traveling at a second speed.

SUMMARY OF THE INVENTION

Briefly, this invention relates to an apparatus for transferring a discrete portion of a first web traveling at a first speed onto a second web traveling at a second speed. The apparatus includes a converting mechanism capable of forming at least one discrete portion out of the first web. An anvil roll is positioned in close proximity to the converting mechanism and can travel at a rotational speed equal to or greater than the first speed. The anvil roll is a vacuum roll that is capable of directing the discrete portion away from the converting mechanism. A transfer roll is arranged in close proximity to the anvil roll and initially travels at a rotational speed equal to the anvil roll. The transfer roll forms a gap with the anvil roll through which the discrete portion can pass. The transfer roll is also a vacuum roll that is capable of directing the discrete portion away from the anvil roll. The transfer roll is capable of changing rotational speed to match the second speed during a single revolution. A backing roll is arranged in close proximity to the transfer roll and travels at a rotational speed equal to the second speed. The backing roll cooperates with the transfer roll to combine the discrete portion with the second web.

The general object of this invention is to provide an apparatus for transferring a discrete portion of a first web onto a second web. A more specific object of this invention is to provide an apparatus for transferring a discrete portion of a first web onto a second web when the first and second webs are traveling at different speeds.

Another object of this invention is to provide an apparatus for making a matched speed transfer of a discrete portion of a first web traveling at a first speed onto a second web traveling at a second speed.

Still another object of this invention is to provide an apparatus for transferring and attaching a discrete portion of a first web onto a second web when the two webs are traveling at different speeds.

Still further, an object of this invention is to provide an apparatus for transferring a discrete portion of a first web traveling at a first speed onto a second web traveling at a second speed while greatly reducing induced stresses in the webs.

Still further, another object of this invention is to provide an economical and efficient apparatus for transferring and attaching a discrete portion of a first web onto a second web when the two webs are traveling at the same or at different speeds.

Other objects and advantages of the present invention will become more apparent to those skilled in the art in view of the following description and the accompanying drawings.

DETAILED DESCRIPTION OF THE PREFERRED EMBODIMENTS

Figure 1:
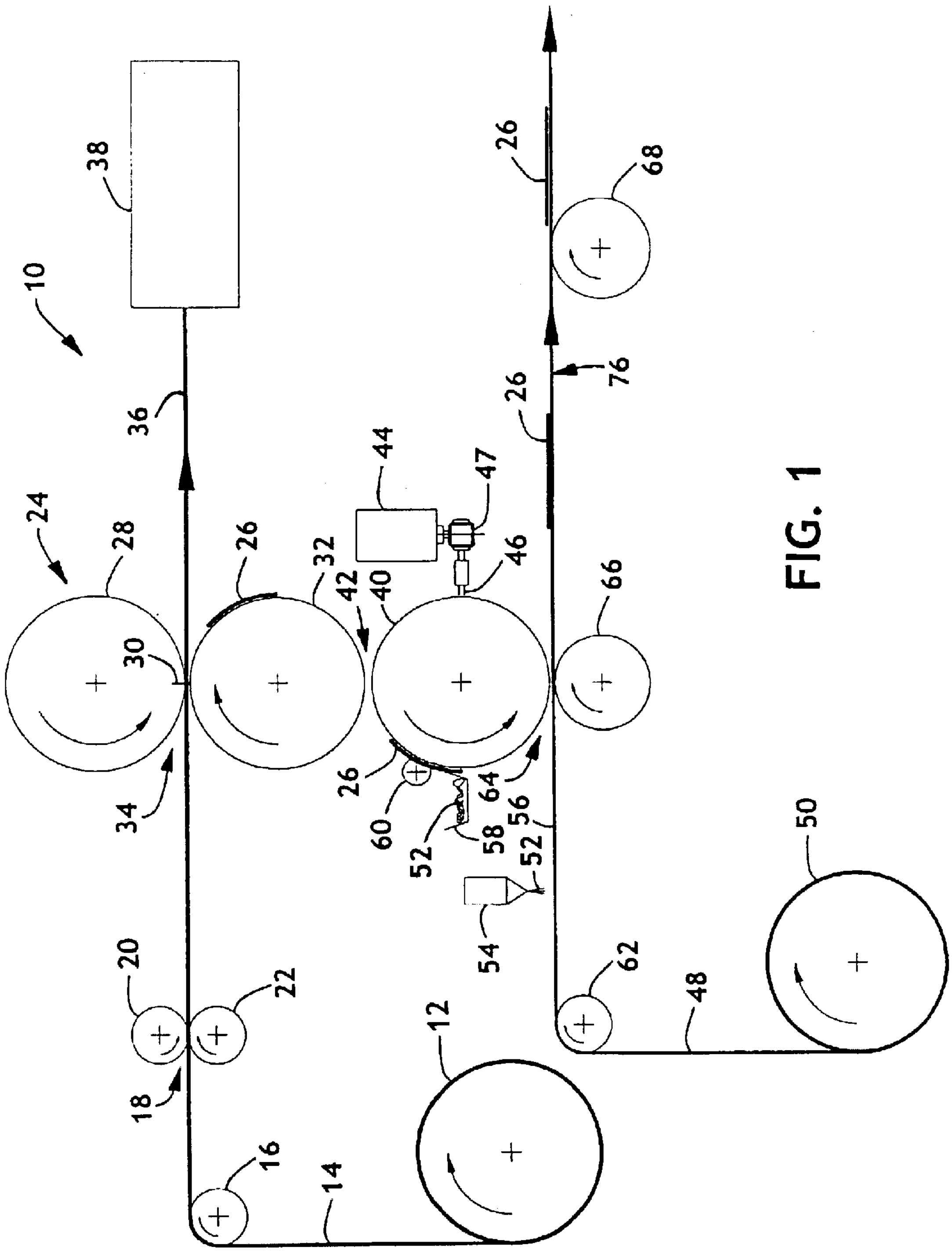
FIG. 1 is a schematic diagram of an apparatus for transferring a discrete portion of a first web onto a second web.

Referring to FIG. 1, a schematic is depicted for a method of transferring a discrete portion of a first web onto a continuous second web when the first and second webs are traveling at the same or at different speeds. The method uses an apparatus 10 that includes a supply roll 12 containing a first web 14. The first web 14 can be almost any kind of material. Typical materials include paper, cellulose fibers, pulp, plastic film, cloth, non-woven materials including spunbond, and various synthetic and non-synthetic materials. Other materials can also be used. The first web 14 can also be a composite formed from two or more similar or different materials joined together. The first web 14 can also be a laminate formed from two or more layers of material. The first web 14 can be primed or treated with a coating. The first web 14 can also be flexed or otherwise manipulated to provide certain desirable properties. An adhesive can be applied to at least one side of the first web 14, if desired. However, the adhesive should not have such a strong peel strength that it would stick to downstream equipment. Furthermore, the first web 14 can be a continuous thin sheet or strip or it can have a three dimensional profile. For example, the first web 14 can be flat, lofty or bulky and may vary in thickness in the longitudinal and/or transverse directions.

The first web 14 can have any width that will be accommodated by the equipment it is designed to run on. Typical widths for absorbent articles can vary from between about 1 inch to about 36 inches (about 25.4 mm to about 914.4 mm). Preferably, the width of the first web 14 will be equal to or less than about 24 inches (about 609.6 mm). More preferably, the width of the first web 14 will be equal to or less than about 18 inches (about 457.2 mm). The length of the first web 14, measured parallel to the machine direction, is generally greater than the width of the first web 14. The length of the first web 14 should be as long as practicably feasible so as to decrease the number of changeovers required. The first web 14 is generally considered "continuous" if it has only one beginning and one ending point on the supply roll 12.

The first web 14 is advanced from the supply roll 12 around one or more guide rolls 16 (only one of which is depicted). The number of guide rolls 16 will vary depending on a number of factors, including the length and width of the first web 14, the distance the first web 14 has to travel, the desired tension, etc. The first web 14 is advanced through a nip 18 formed by the contact between a pair of feed rolls 20 and 22. One or both of the feed rolls 20 and 22 can be driven, that is, rotated by a motor, to advance the first web 14. More than one pair of feed rolls 20 and 22 can be used if one wishes to stretch the first web 14. Preferably, the pair of feed rolls 20 and 22 will be driven so as to pull or draw the first web 14 away from the supply roll 12 and toward a converting mechanism 24.

The converting mechanism 24 can be any type of device needed to cut, slice, die cut, stamp, bond or form a discrete portion 26 of desired dimensions from the first web 14. For example, the converting mechanism 24 can be a rotary cutter 28 having one or more knives 30 secured about its outer periphery. One knife 30 is shown secured to the rotary cutter 28 in FIG. 1. The knife 30 can have a linear or a nonlinear configuration. The knife 30 can be designed to completely sever the first web 14 or it could be configured to form the discrete portion 26 into a desired shape, such as into a rectangle, square, circle, oval, hourglass or some other desired shape. Besides the knife 30, other suitable cutting apparatuses could be used. Such devices include two or more blades, a die, a stamp, an ultrasonic device, or any other suitable device known to those skilled in the art.

When the converting mechanism 24 is a rotary cutter 28, it should span across the width of the first web 14. The rotary cutter 28 cooperates with and is positioned in close proximity to an anvil roll 32 and forms a gap 34 therebetween. However, the knife 30 will rotate into contact with or be aligned to be very close to the outer surface of the anvil roll 32. The knife 30 will form a nip with the anvil roll 32 so that the first web 14 can be severed. In FIG. 1, the rotary cutter 28 is shown as rotating in a counterclockwise direction while the anvil roll 32 is rotated in a clockwise direction. Preferably, both the rotary cutter 28 and the anvil roll 32 can have the same outside diameter and will rotate at the same speed. However, the rotary cutter 28 and the anvil roll 32 do not have to have the same outside diameter and can be setup to rotate at the same or at different speeds.

As the first web 14 passes through the gap 34 and is contacted by the knife 30, a discrete portion 26 will be formed for each 360-degrees of rotation of the rotary cutter 28. It should be noted that when the rotary cutter 28 has more than one knife 30 attached to its outer surface, a discrete portion 26 will be formed for each partial rotation of the rotary cutter 28. Sometimes, the shape of the discrete portion 26 is such that trim waste 36 will be present after the discrete portion 26 is formed and separated from the first web 14. This trim waste 36 can be directed to a recycling hopper 38 where it can be collected and later reused to make new material. The trim waste 36 can be in the form of a single continuous strip or it can consist of a plurality of smaller individual pieces.

The size and shape of the discrete portion 26 can vary. Generally, the length of the discrete portion 26 will change depending on the type of product being produced by the manufacturer. For example, some manufacturers of disposable absorbent articles will produce similar pads that will vary only in overall dimensions. Typically, the length of the discrete portion 26, when forming an absorbent article, can range from between about 1 inch to about 24 inches (about 25.4 mm to about 609.6 mm). Preferably, the length of the discrete portion 26 can range from between about 1 inch to about 16 inches (about 25.4 mm to about 406.4 mm), and most preferably, the length of the discrete portion 26 will be equal to or less than about 12 inches (about 304.8 mm). In some methods, a plurality of discrete portions 26 may be cut and transferred simultaneously. For example, two parallel strips may be cut from the first web 14. There may be a large amount of space between the two strips, or there may be little or no spacing. The length of the discrete portion 26 is controlled by the rotational speed of the feed rolls 20 and 22, the placement of the knife or knives 30 on the rotary cutter 28, as well as other factors known to those skilled in the art.

In FIG. 1, the discrete portion 26 that is formed by passing the first web 14 under the knife 30 is immediately transferred onto the outer surface of the anvil roll 32. As the anvil roll 32 is rotated, the discrete portion 26 is carried away from both the rotary cutter 28 and from the trim waste 36. To assist in holding the discrete portion 26 on the outer surface of the anvil roll 32, a vacuum can be used. The vacuum or suction needed to draw the discrete portion 26 against the outer surface of the anvil roll 32 can be adjusted to meet one's needs depending on the size, shape, weight, dimensions and material characteristics of the discrete portion 26. Typically, the anvil roll 32 is constructed of a strong material, such as steel, cast iron, aluminum, hard rubber or a hard thermoplastic material. It is also possible to harden the outer surface of the anvil roll 32 to prolong its life since it will match up with the knife 30 on the rotary cutter 28. In addition, the outer surface of the anvil roll 32 can be coated to make it smooth and/or slick. Alternatively, the outer surface of the anvil roll 32 could be treated or machined to form a non-skid surface, a textured surface or a surface of high friction. The formation of grooves or a serrated configuration could be beneficial in certain instances.

It should be noted that the outside diameter of the anvil roll 32 could be made to almost any desired dimension. A typical outside diameter for an anvil roll 32 used to make disposable absorbent articles would range from between about 2 inches to about 26 inches (about 50.8 mm to about 660.4 mm). More preferably, the outside diameter of the anvil roll 32 will range from between about 4 inches to about 13 inches (about 101.6 mm to about 330.2 mm). Most preferably, the outside diameter of the anvil roll 32 will be equal to or less than about 12 inches (about 304.8 mm). It should be noted that the outside diameter of the anvil roll 32 could be smaller, equal to or larger than the outside diameter of the rotary cutter 28.

The rotational surface speed of the anvil roll 32 can be slower than, equal to or greater than the rotational surface speed of the rotary cutter 28. Preferably, the rotational speed of the rotary cutter 28 and the anvil roll 32 are the same. Furthermore, the anvil roll 32 should travel at a rotational speed at least equal to the speed of the first web 14 and preferably at a faster speed. In some instances, depending on the length of the discrete portion 26, the discrete portion 26 will be at least partially located on the outer surface of the anvil roll 32 when the knife 30 is cutting the opposite end of the discrete portion 26. In some situations, the discrete portion 26 will slip on the anvil roll 32 since the feed rate of the first web 14 is slower than the surface speed of the rotary cutter 28 or the anvil roll 32. To ensure a smooth slip of the discrete portion 26 on the outer surface of the anvil roll 32 with decreased binding, gapping and pulling, it may be desirable to size the gap 34 to have a minimal clearance. The discrete portion 26 can then continue to slip on the anvil roll 32 until it is completely cut by the knife 30. The actual severance of the discrete portion 26 from the first web 14 will release the discrete portion 26 and allow it to be completely transferred to the anvil roll 32.

The discrete portion 26 will adhere to the outer surface of the anvil roll 32 because of the vacuum being pulled from within the anvil roll 32. Generally, the outer surface of the anvil roll 32 will have a plurality of small holes formed therein that are connected to a source of vacuum. The force of the vacuum can range from between about 0.1 inches (about 2.54 mm) of water pressure to about 50 inches (about 1270 mm) of water pressure. Preferably, the force of the vacuum will be less than about 30 inches (762 mm) of water pressure, and most preferably, the force of the vacuum will be less than about 15 inches (about 381 mm) of water pressure. The vacuum is pulled from the center of the anvil roll 32 so that the discrete portion 26 will adhere to the outer surface of the anvil roll 32. The amount of vacuum that will be needed will also be dependent upon the porosity of the material from which the discrete portion 26 is formed. The surface area of the discrete portion 26 over which the vacuum will act will also change and should be taken into consideration when calculating the amount of vacuum needed.

It should be noted that the discrete portion 26, when completely severed from the first web 14, should adhere to the outer surface of the anvil roll 32 and should travel at the rotational speed of the anvil roll 32.

Still referring to FIG. 1, one will notice that the discrete portion 26 is transferred from the anvil roll 32 onto a transfer roll 40. The two rolls 32 and 40 are positioned in close proximity to one another and are arranged to form a gap 42 therebetween. The gap 42 isolates the transfer roll 40 from vibrations and stresses induced in the anvil roll 32 by its interaction with the rotary cutter 28. The gap 42 should be sized to permit the discrete portion 26 to be transferred onto the outer surface of the transfer roll 40 without being unduly compressed. The transfer roll 40 can have a diameter that is smaller than, equal to or larger than the diameter of the anvil roll 32. Preferably, the transfer roll 40 will have the same diameter as both the anvil roll 32 and the rotary cutter 28. The transfer roll 40 is a vacuum roll. The transfer roll 40 can be constructed of similar materials as the anvil roll 32. Typical materials include steel, aluminum, hard rubber or a hard thermoplastic material. Alternatively, the transfer roll 40 can be constructed from low inertia materials like composite materials, graphite, a polycarbonate material, carbon fiber, KEVLAR® or nylon. KEVLAR® is a registered trademark of E.I. DuPont de Nemours & Company that has an office at 1002 Market Street, Wilmington, Del. 19801.

As the weight of the transfer roll 40 decreases, the faster it is capable of changing speed within a single rotational cycle. The outer surface of the transfer roll 40 can also be rubber-coated, treated or machined, similar to what has been previously described with reference to the anvil roll 32. The type of surface utilized on the transfer roll 40 will depend upon one's preference, as well as on the material from which the discrete portion 26 is formed.

An adjustable, variable speed servomotor 44 drives the transfer roll 40 via a connector 46. The transfer roll 40 is depicted as being driven in a counterclockwise direction. The connector 46 can be a coupling that joins two rotational shafts together. One shaft extending out of the servomotor 44 and the other shaft supports the transfer roll 40. A gearbox 47 can also be positioned across the connector 46 and will function to change the torque requirements of the servomotor 44. The gearbox 47 can be a low inertia gearbox that can increase or decrease the torque output of the servomotor. Preferably, the gearbox 47 will reduce the torque output of the servomotor 44 by a factor of at least about 5 to 1, and more preferably, by a factor of at least about 3 to 1.

The function of the transfer roll 40 is to transport the discrete portion 26 toward a second web 48. Because of this, the transfer roll 40 will initially be traveling at the same speed as the anvil roll 32. The speed of the transfer roll 40 can then be changed to match the speed of the second web 48. Like the first web 14, the second web 48 can be unrolled from a supply roll 50. The second web 48 can be almost any kind of material. Typical materials used to manufacture an absorbent article include paper, cellulose fibers, pulp, plastic film, cloth, non-woven materials including spunbond, as well as various synthetic and non-synthetic materials. Other materials can also be used. The second web 48 can also be a composite formed from two or more similar or different materials. The second web 48 can also be a laminate formed from two or more layers of material. The second web 48 can be primed or treated with a coating. The second web 48 can also be flexed or otherwise manipulated to provide certain desirable properties. Furthermore, the second web 48 can be a continuous thin sheet or strip or it can have a three dimensional profile. For example, the second web 48 can be flat, lofty or bulky and may vary in thickness in the longitudinal and/or transverse directions.

The purpose of this invention is to be able to transfer a discrete portion 26 of a first web 14, which is travelling at a first speed, onto a second web 48, which is travelling at a second speed. The first and second speeds will most likely be different although they could be the same. In manufacturing disposable absorbent articles, the second speed will generally be faster than the first speed.

The second web 48 may be a virgin web. A virgin web is a web that has no additional layers, attachments or modifications thereto. Alternatively, and most usually, the second web 48 will have been at least somewhat processed, for example, scored, slitted, or had other discrete portions applied thereon. For example, for a disposable absorbent article, several discrete portions of elastic or some other material may have already been applied to the second web 48 before the discrete portion 26 is added.

The second web 48 can have any width that will be accommodated by the equipment it is designed to run on. Typical widths for manufacturing disposable absorbent articles can vary from between about 1 inch to about 36 inches (about 25.4 mm to about 914.4 mm). Preferably, the width of the second web 48 will be equal to or less than about 24 inches (about 609.6 mm). More preferably, the width of the second web 48 will be equal to or less than about 18 inches (about 457.2 mm). The length of the second web 48, measured parallel to the machine direction, is generally greater than the width of the second web 48. The length of the second web 48 should be as long as practicably feasible so as to decrease the number of changeovers required. The second web 48 is generally considered "continuous" if it has only one beginning and one ending point on the supply roll 50.

It should be noted that an adhesive 52 could be dispensed from a mechanism 54, such as a spray nozzle, a slot coater, a bead applicator, etc. onto at least one surface of the second web 48. Preferably, the adhesive 52 is applied to an upper surface 56 of the second web 48. Alternatively, the adhesive 52 can be in the form of a liquid bath that is retained in a container 58. A roller 60 can be positioned relative to the container 58 so as to apply the adhesive 52 onto one surface of the discrete portion 26 while the discrete portion 26 is held by vacuum onto the outer surface of the transfer roll 40. Alternatively, the adhesive 52 could be applied by other means known to those skilled in the art.

The second web 48 is advanced from the supply roll 50 around one or more guide rolls 62 (only one of which is depicted). The number of guide rolls 62 will vary depending on a number of factors, such as the length and width of the second web 48, the distance the second web 48 has to travel, the desired tension, as well as other factors known to those skilled in the art.

The second web 48 is advanced between a gap 64 formed between the transfer roll 40 and a backing roll 66. The backing roll 66 is positioned in close proximity to the transfer roll 40 and cooperates therewith. The backing roll 66 can have a diameter larger than, equal to or smaller than the diameter of the transfer roll 40. Preferably, the transfer roll 40 has a larger diameter than the backing roll 66. The backing roll 66 can have a rotational speed equal to that of the second web 48. The second web 48 is advanced by a feed mechanism 68 that is located downstream of the gap 64. The feed mechanism 68 can consist of various equipment including a pair of feed rolls, one or more process rolls, a vacuum conveyor, die rolls, functional rolls, S-wrapped rolls, nip rolls, etc. The purpose of the feed mechanism 68 is to pull or draw the second web 48 along at a steady speed. Preferably, the feed mechanism 68 is a process roll.

In FIG. 1, the backing roll 66 is rotating in a clockwise direction and is arranged in close proximity to the transfer roll 40. The gap 64 formed between these two rolls 40 and 66 should be large enough to enable the discrete portion 26 and the second web 48 to pass therebetween without being unduly compressed. Preferably, the gap 64 will be dimensioned to provide a passage for the discrete portion 26 and the second web 48 with limited compression.

Figure 2:
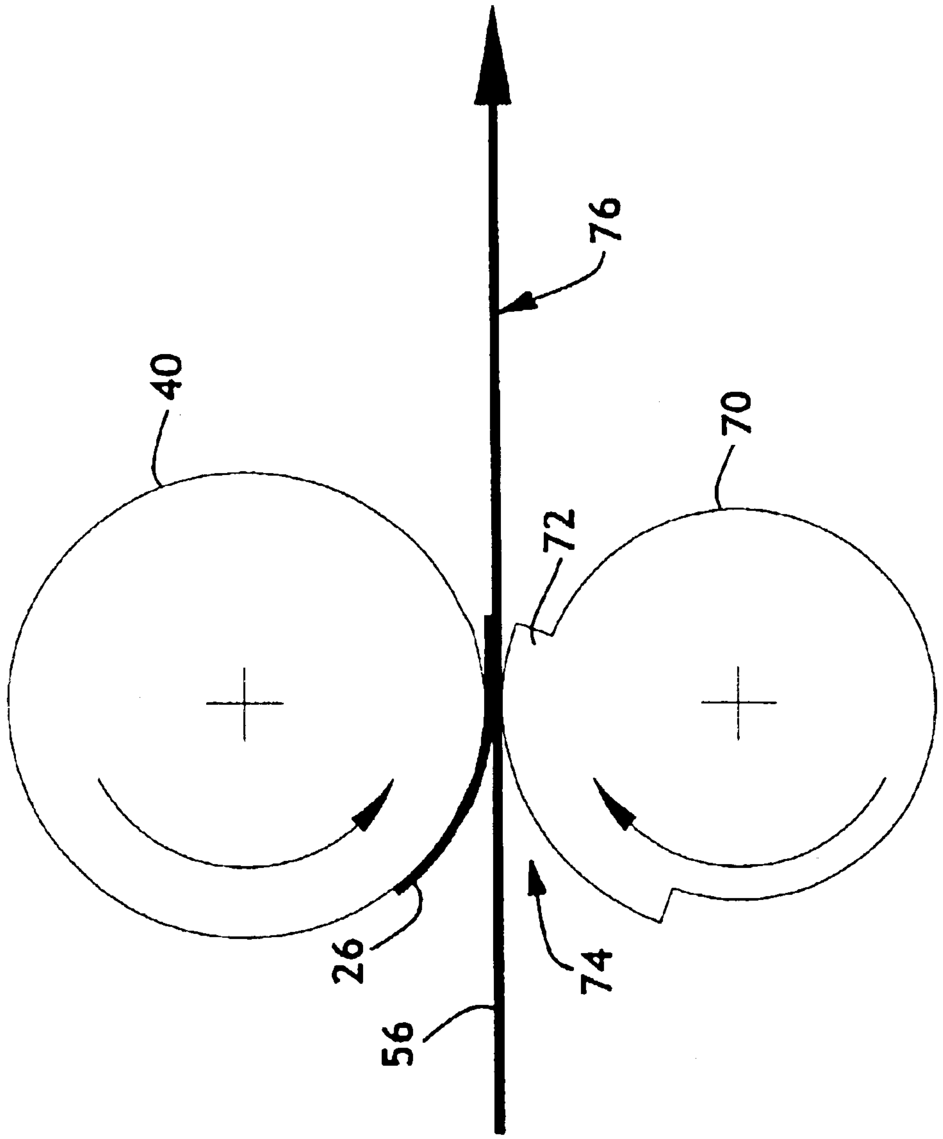
FIG. 2 is a side view of a stomper roll interacting with a transfer roll to form a nip therebetween.

Referring to FIG. 2, the backing roll 66 can be replaced by a stomper roll 70 having a protruding section 72. When the stomper roll 70 is used with the transfer roll 40, a nip 74 is formed between the two rolls 40 and 70. The stomper roll 70 is used to squeeze or press the discrete portion 26 against the second web 48 and form an attachment therebetween. For example, the stomper roll 70 can assist in squeezing any adhesive 52 present on the upper surface 56 of the second web 48 against the discrete portion 26 to form a secure bond therebetween.

Either the backing roll 66 or the stomper roll 70 can be used to help position, attach or secure the discrete portion 26 to the second web 48. Usually both the backing roll 66 and the stomper roll 70 are driven rolls that can be rotated by a motor or a belt drive. If the material forming the second web 48 is stiff, the backing roll 66 does not have to be driven but could be freely rotatable. It should also be noted that for some methods, the backing roll 66 or stomper roll 70 could be replaced by a vacuum screen, a belt, a vacuum conveyor, a movable web or some other device. One requirement is that the substituted device be capable of providing the necessary compression to produce the pressure necessary to attach or secure the discrete portion 26 to the second web 48.

Once the discrete portion 26 has been brought into contact with the second web 48 and is either positioned thereon or is attached or secured thereto, a combination web 76 is formed. This combination web 76 can be a continuous strip or be cut into individual segments. The combination web 76 can be wound on a roll, converted to a desired form, or be transported to another process where it can be utilized to make a finished product. The combination of all the discrete portions 26, adhesives 52 and other items applied to the second web 48 can produce a finished disposable absorbent article.

Returning to the discussion on the method of driving the transfer roll 40, one skilled in the art will quickly recognize some of the advantages of driving the transfer roll 40 with the variable speed servomotor 44. A first advantage of driving the transfer roll 40 with a variable speed servomotor 44 is that it enables the transfer roll 40 to accelerate and/or decelerate quickly within a single revolution. The transfer roll 40 should be able to increase and/or decrease its speed during each 360-degree rotation. The variable speed servomotor 44 can be either an alternating current (AC) motor or a direct current (DC) motor. Preferably, the servomotor 44 is an AC motor. The actual horsepower produced by the variable speed servomotor 44 should be sufficient to provide enough torque and speed to drive the transfer roll 40 without any lagging or hesitation. A computer can be used to control the output of the servomotor 44. Servomotors are commercially available from various equipment vendors. One such vendor is Rockwell Automation having an office at 1201 South Second Street Milwaukee, Wis. 53204-2496.

A second advantage of using the variable speed servomotor 44 for controlling the torque and speed of the transfer roll 40 is that a smooth speed transition is obtainable. Since the transfer roll 40 is independently driven by the servomotor 44 and is isolated from the anvil roll 32 by the gap 42, the other moving parts will not be influenced by it. This independent aspect of the servo-driven transfer roll 40 provides a smoother and more stable speed change, and decreases any vibrations or frequencies which may be created by the other mechanisms. A decrease in vibrations corresponds to a decrease in the amount of errors or mistakes (such as wrinkles, puckers or tears) when applying the discrete portion 26 to the second web 48. Also, as the discrete portion 26 is positioned on or applied to the second web 48, the amount of shock created on the second web 48 is decreased.

A third advantage of the variable speed servomotor 44 is that it is an electronically controlled mechanism. This eliminates the need for a mechanical mechanism controlled by gears, chains, or manual switches. The electronically controlled mechanism allows for a smoother transfer of power to the transfer roll 40.

It is preferred that the speed of the transfer roll 40 be changed from a first speed to a second speed after the entire discrete portion 26 is transferred from the anvil roll 32 to the transfer roll 40. This will provide a smooth transfer and will reduce any shock, gapping, or pulling on the discrete portion 26. However, depending upon the length of the discrete portion 26 and the diameter of the transfer roll 40, this may not be possible. Sometimes, the physical set up of the apparatus as well as other factors, may require the speed of the transfer roll 40 to be changed while the discrete portion 26 is positioned on the outer surface of both of the rolls 32 and 40. The present apparatus 10 and method allows for this.

The speed of the transfer roll 40 can be controlled by "step" inputs, that is, a sudden and immediate change from a first speed to a second speed or it can be controlled by "ramp" inputs. The actual curve of the input will be dependent upon the drive capabilities and the tuning parameters that can be programmed into the controlling computer by the user. The first speed of the transfer roll 40 will usually correspond to the speed of the anvil roll 32 and the second speed of the transfer roll 40 will correspond to the speed of the second web 48.

It is foreseen that the apparatus and method of this invention can operate at high speeds to produce a plurality of absorbent articles per minute. Thus as little time as possible should be used to accelerate or decelerate the speed of the transfer roll 40. When manufacturing absorbent articles, the servomotor 44 should be capable of completing at least 100 cycles per minute. More preferably, the servomotor 44 should be capable of completing at least 250 cycles per minute. Most preferably, the servomotor 44 should be capable of completing at least 400 cycles per minute.

Figure 3:
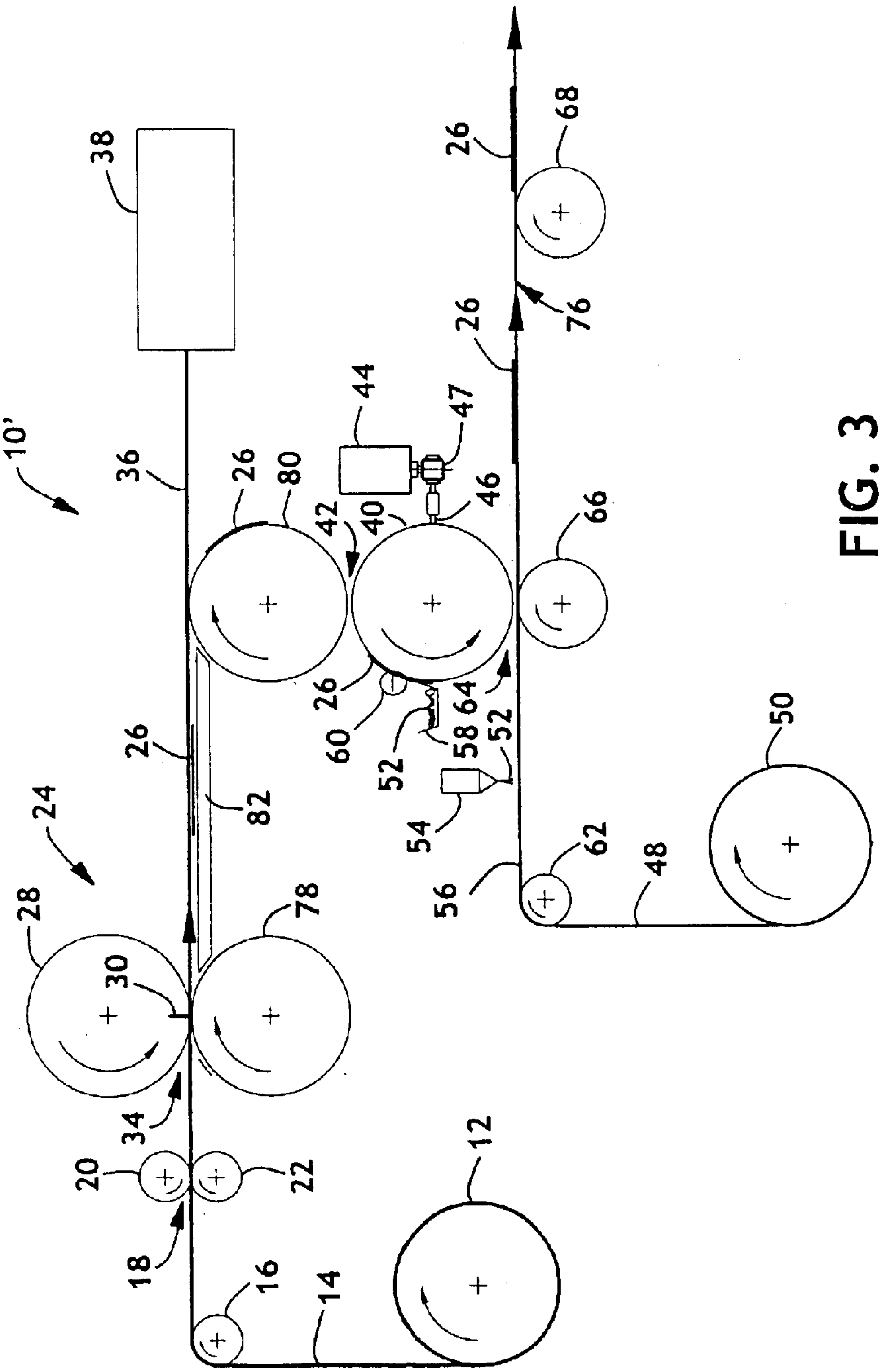
FIG. 3 is a schematic diagram of an alternative apparatus for transferring a discrete portion of a first web onto a second web.

Referring now to FIG. 3, an alternative embodiment is depicted for a method of transferring the discrete portion 26 from the first web 14, travelling at a first speed, onto the second web 48, travelling at a second speed. The numerals used in FIG. 3 are the same as those used in FIG. 1 to denote identical elements. The method uses an apparatus 10' that is similar to that shown in FIG. 1 except that a non-vacuum anvil roll 78 is used along with an intermediate transfer roll 80. The non-vacuum anvil roll 78 cooperates with the rotary cutter 28 to form the discrete portions 26. However, each discrete portion 26 is not carried onto the outer surface of the anvil roll 78. Instead, each discrete portion 26 moves downstream and contacts the outer circumference of an intermediate transfer roll 80. The intermediate transfer roll 80 is a vacuum roll and will rotate at the same surface speed as the adjacent anvil roll 78. The outside diameter of the intermediate transfer roll 80 can be smaller than, equal to or larger than the diameter of the transfer roll 40. The diameter of the intermediate transfer roll 80 can also be smaller than, equal to or larger than the diameter of either the rotary cutter 28 and/or the non-vacuum anvil roll 78. Preferably, the intermediate transfer roll 80 will have an outside diameter that is equal to the outside diameter of the transfer roll 40. Most preferably, the rotary cutter 28, the non-vacuum anvil roll 78, the intermediate transfer roll 80 and the transfer roll 40 will all have the same outside diameter.

A plate 82 can be positioned downstream of the non-vacuum anvil roll 78 to assure that each discrete portion 26 that is cut will not fall between the non-vacuum anvil roll 78 and the intermediate transfer roll 80. The plate 82 can also function to prevent the discrete portion 26 from physically staying on the outer surface of the non-vacuum anvil roll 78. The plate 82 can be formed from different materials, for example, steel or aluminum, and can be closely aligned with the two rolls 78 and 80.

Alternatively, the arrangement shown in FIG. 3 will work equally well when the discrete portion 26 is attached to the trim waste 36 by one or more narrow fingers. The fingers can be designed to be easily broken as the discrete portion 26 comes into contact with the vacuum of the intermediate transfer roll 80. The fingers will assure that each discrete portion 26 will not fall down between the non-vacuum anvil roll 78 and the intermediate transfer roll 80. Instead, the discrete portion 26 will be urged onto the outside surface of the intermediate transfer roll 80 by the vacuum. The fingers will be easily broken by the force of the vacuum pulling on the discrete portion 26 thereby allowing the discrete portion 26 to move away from the trim waste 36.

Figure 4:
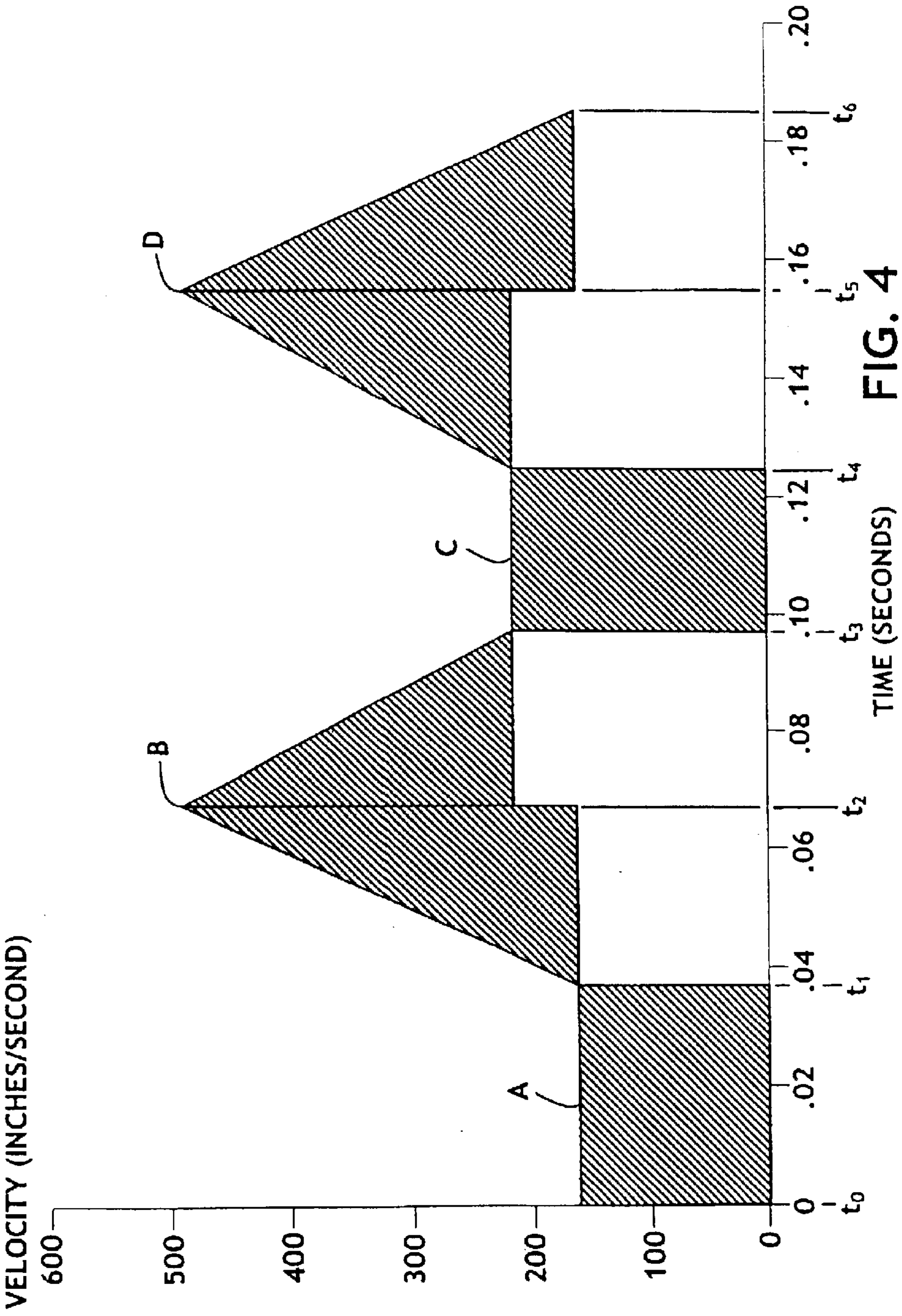
FIG. 4 is a graphic representation of the speed modulation of the transfer roll being driven by a servomotor during a single revolution.

Referring now to FIG. 4, a graphic representation of the speed modulation for the servo-driven transfer roll 40 is shown. The speed of the transfer roll 40, in seconds, is plotted along the x-axis and the velocity, in inches per second, is plotted along the y-axis. The transfer roll 40 was sized to have a circumference of about 30 inches (about 762 mm) and was operated at about 325 cycles per minute. The profile of the speed of the transfer roll 40 was measured when the speed of the second web 48 was traveling at about 1,085 feet per minute (about 33,070 cm/min) and the first web 14 was traveling at about 325 feet per minute (9,906 cm/min.). It should be noted that this invention would work when the speed of the first web 14 is less than, equal to or greater than the speed of the second web 48.

The transfer roll 40 was set up as is depicted in FIG. 1 and the discrete portion 26 had a length of about 12 inches (about 304.8 mm). One complete revolution of the transfer roll 40 occurred every 360-degrees. It was assumed that the acceleration and deceleration of the transfer roll 40 could begin after at least one half of each discrete portion 26 was positioned on the transfer roll 40. Starting at a time $t_0$ and continuing until time $t_1$, the initial speed of the transfer roll 40 was constant at about 163 inches per second (about 4,140 mm/sec.), denoted by reference numeral A. During this time, the discrete portion 26 was being transferred from the outer surface of the anvil roll 32 to the outer surface of the vacuum transfer roll 40 while both rolls 32 and 40 were rotating at the same speed. At time $t_1$, the speed of the transfer roll 40 began to accelerate and continued to accelerate until time $t_2$ when it reached a speed of approximately 490 inches per second (about 12,446 mm/sec.), denoted by reference numeral B. The speed of the transfer roll 40 was then decreased from time $t_2$ to time $t_3$. Starting at time $t_3$, the transfer roll 40 was maintained at approximately 217 inches per second (approximately 5,512 mm/sec.) for a time period extending to time $t_4$, denoted by reference numeral C. The approximately 217 inches per second (approximately 5,512 mm/sec.) was based on a web speed of about 1,085 feet per minute (about 33,070 cm/min.). At this point, the discrete portion 26 was transferred from the transfer roll 40 to the second web 48. The transfer of the discrete portion 26 onto the second web 48 occurred while both the discrete portion 26 and the second web 48 were travelling at the same speed. The transfer roll 40 was then accelerated, starting at time $t_4$, to a speed of approximately 490 inches per second (approximately 1,245 cm/sec.) which was attained at time $t_5$, denoted by reference numeral D. Subsequently, the speed of the transfer roll 32 was decelerated back to the original speed of approximately 163 inches per second (approximately 4, 140 mm/sec.) from time $t_5$ to time $t_6$.

It should be noted that the transfer roll 40 will begin to accelerate prior to the time when the entire discrete portion 26 is attached to the second web 48. This could cause wrinkles to form on the discrete portion 26. The severity of the wrinkles will vary depending upon materials and this should be evaluated on a case by case basis. The wrinkles could be reduced or eliminated depending on the size of the gap 64.

Once the discrete portion 26 has been transferred to the vacuum transfer roll 40, the discrete portion 26 may be transferred to one or more additional transfer rolls or it can be positioned onto or be secured to the second web 48. The apparatuses 10 and 10' and the methods using the apparatuses 10 and 10' are especially useful in manufacturing disposable absorbent articles. It is important that when the discrete portions 26 and the second web 48 are combined, their surface speeds be matched to within at least about 5% of each other. Preferably, the surface speeds will be matched to within at least about 3% of each other. More preferably, the surface speeds will be matched to within at least about 1% of each other. By matching the speeds of the discrete portions 26 and the second web 48, shock loading can be reduced and wrinkles, gaps, and other defects can be eliminated. When the discrete portions 26 are combined with the second web 48 at different speeds, registration problems can occur. Furthermore, other downstream problems in the converting and/or in the packaging operations can occur when the speeds are not matched.

Once the discrete portion 26 is at least partially transferred from the transfer roll 40 onto the second web 48, the servo-driven transfer roll 40 can be accelerated and decelerated back to a first speed that will match the speed of the anvil roll 32. This will enable the transfer roll 40 to accept another incoming discrete portion 26 from the anvil roll 32 while rotating at the same speed as the discrete portion 26.

When the second web 48 is travelling faster than the first web 14, the discrete portion 26 can be severed from the first web 14 by the rotary cutter 28. The discrete portion 26 is then attracted to the outer surface of the anvil roll 32 by a vacuum. The transfer of the discrete portion 26 onto the outer circumference of the transfer roll 40 can occur when at least half of the discrete portion 26 is on the transfer roll 40. This can be accomplished by adjusting the vacuum levels between the transfer roll 40 and anvil roll 32, as well as the surface roughness of the rolls 32 and 40. As long as the transfer roll 40 has a greater surface force, the discrete portion 26 will slip on the anvil roll 32. The transfer roll 40 is first accelerated and then decelerated to match the speed of the second web 48. The reason the transfer roll 40 is accelerated and then decelerated is because of the distance the discrete portion 26 has to travel on the outer circumference of the transfer roll 40 in a given period of time. As the transfer roll 40 rotates, the remainder of the discrete portion 26 is pulled from the slower moving anvil roll 32. As the discrete portion 26 enters the gap 64, it is transferred onto the second web 48 and can be secured thereto, if desired. Once at least half of the discrete portion 26 is transferred onto the second web 48, the servo-driven transfer roll 40 is decelerated so as to be at the proper speed to pick up another incoming discrete portion 26 from the anvil roll 32. Likewise, the discrete portion 26 will be transferred after half of the discrete portion 26 is transferred by adjusting the vacuum levels.

Figure 5:
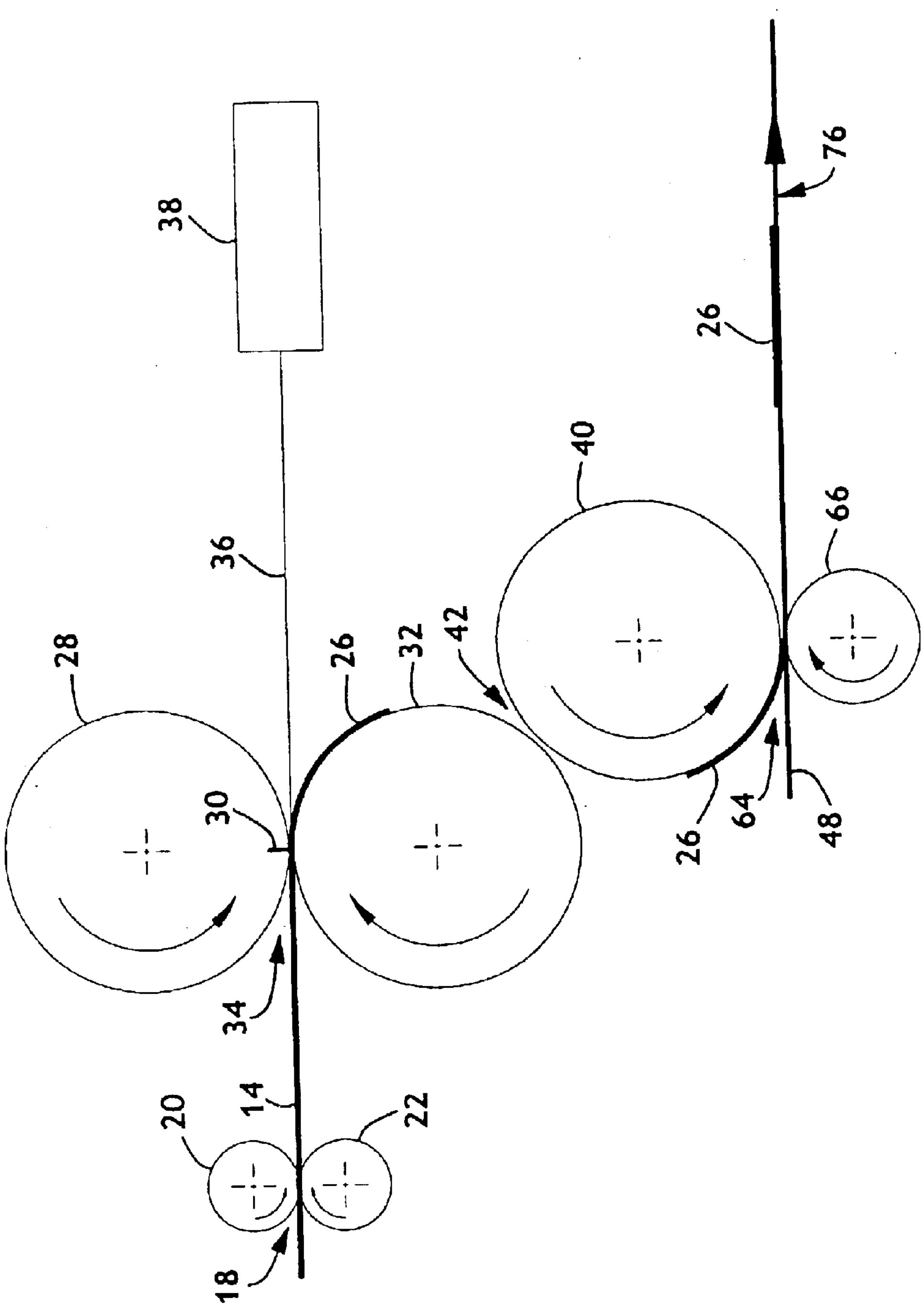
FIG. 5 is a schematic diagram of an alternative apparatus for transferring a discrete portion of a first web onto a second web using a transfer roll which is not vertically aligned with the anvil roll and rotary cutter.
Figure 6:
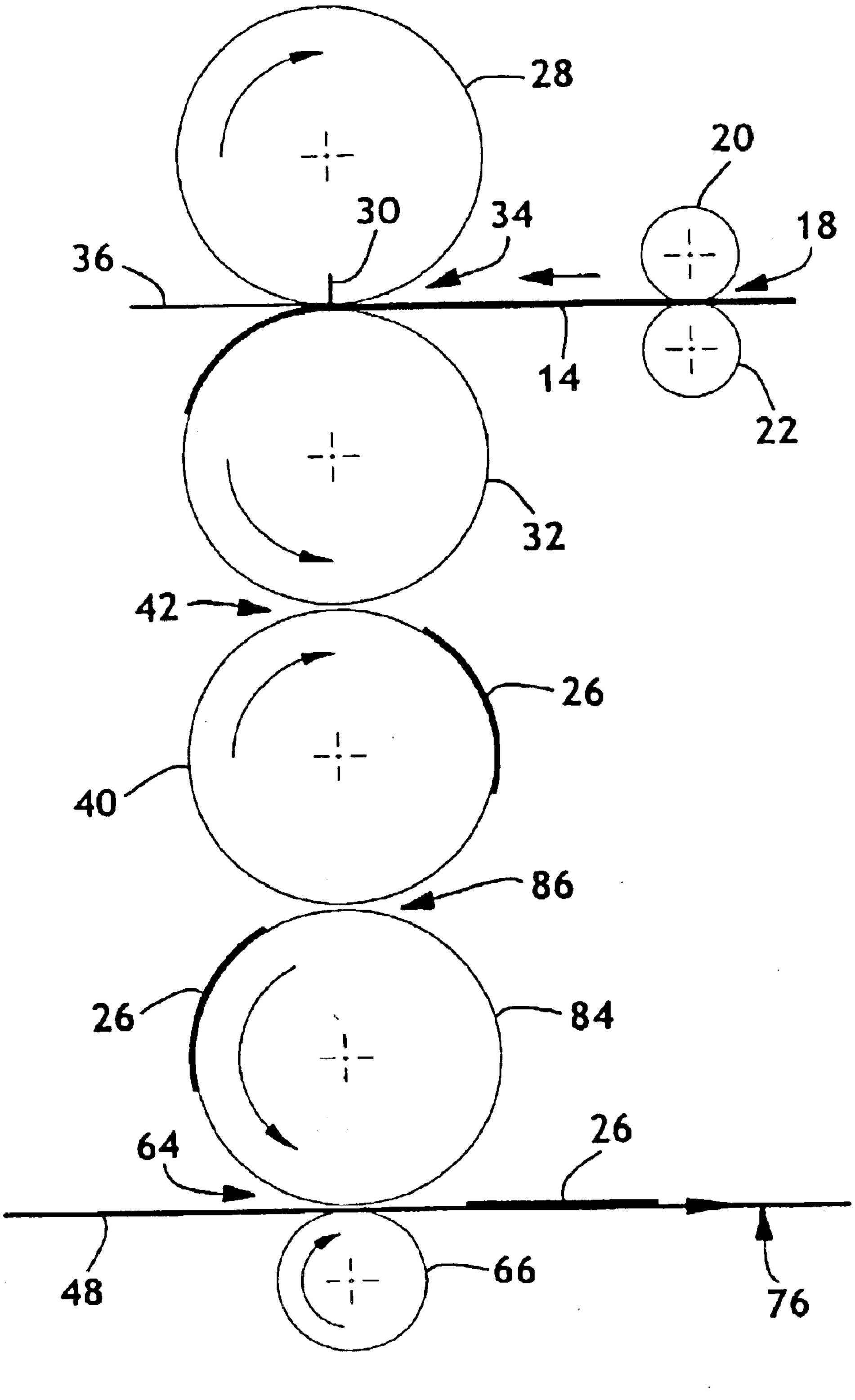
FIG. 6 is a schematic diagram of an alternative apparatus for transferring a discrete portion of a first web onto a second web using at least two transfer rolls vertically aligned with the anvil roll and the rotary cutter.
Figure 7:
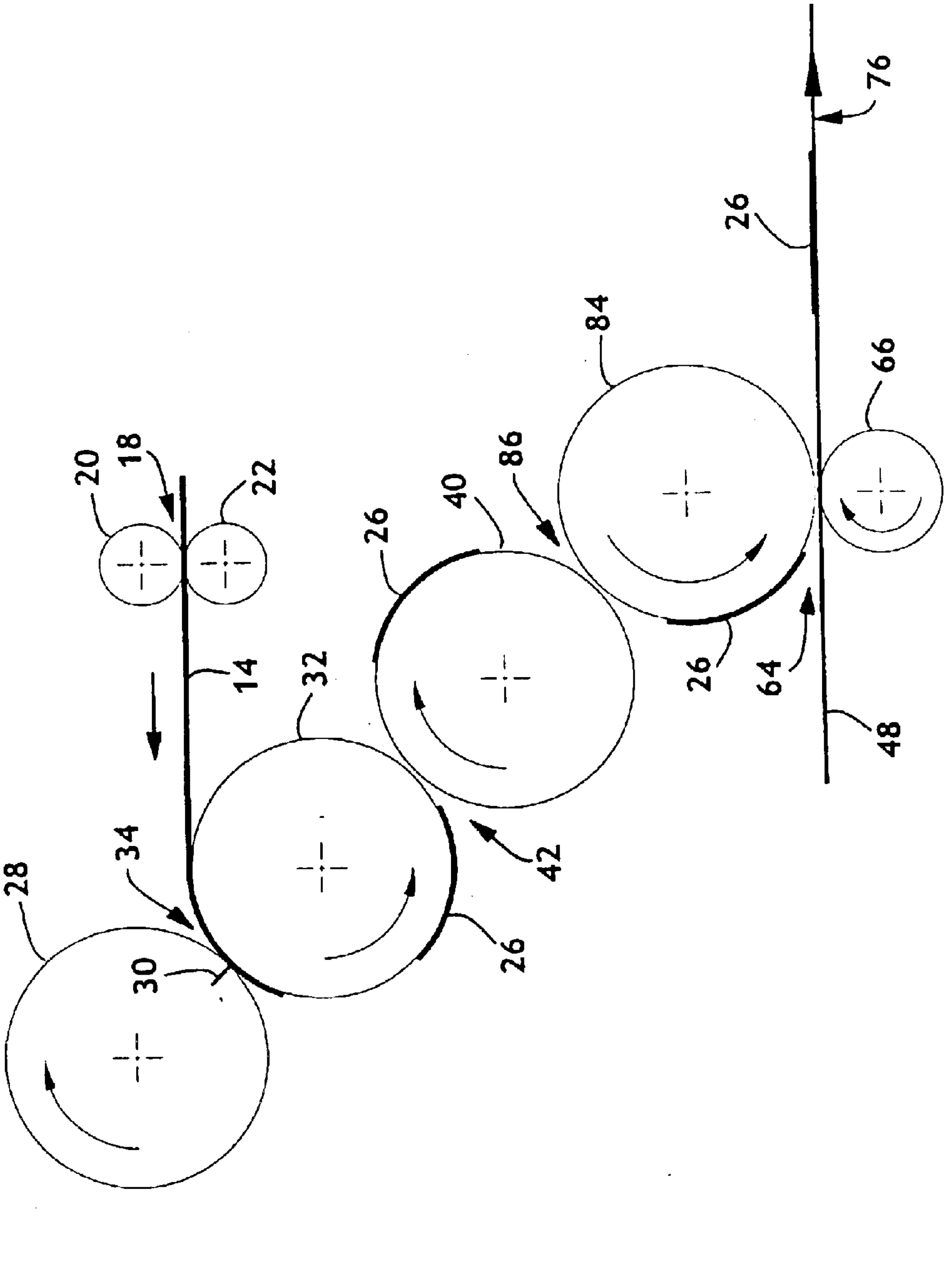
FIG. 7 is a schematic diagram of still another alternative apparatus for transferring a discrete portion of a first web onto a second web using at least two transfer rolls that are not vertically aligned with the anvil roll and the rotary cutter.

Referring to FIGS. 5–7, three alternative arrangements are shown for arranging the various rolls. In addition, the use of more than one servo-driven transfer roll is also depicted. In FIG. 1, the rotary cutter 28, the anvil roll 32, the transfer roll 40 and the backing roll 66 are shown as being vertically aligned. In FIG. 5, the servo-driven vacuum transfer roll 40 is vertically offset from the anvil roll 32 and the rotary cutter 28. This offset can reduce the amount of time the discrete portion 26 is present on the outer circumferences of both the anvil roll 32 and the transfer roll 40. In some instances, because of the length of the discrete portion 26 and the diameters and rotational speeds of the rolls 32 and 40, this arrangement will be more efficient.

In FIG. 6, a vertical arrangement is shown similar to FIG. 1 except that a second servo-driven, vacuum transfer roll 84 is present. In FIG. 6, the first web 14 is directed into the gap 34 from the right side and the rotary cutter 28 is rotated clockwise while the anvil roll 32 is rotated counter-clockwise. The discrete portion 26 is cut and is transferred to a first transfer roll 40 at gap 42. The discrete portion 26 is then transferred from the transfer roll 40 to the second transfer roll 84 at gap 86. The first transfer roll 40 rotates in a clockwise direction while the second transfer roll 84 rotates in a counter-clockwise direction. From the second transfer roll 84, the discrete portion 26 is transferred onto the second web 48.

FIG. 7 shows an arrangement of rolls similar to that shown in FIG. 6 except that in FIG. 7, the anvil roll 32 and the first and second transfer rolls, 40 and 84 respectively, are vertically offset from the rotary cutter 28. This offset arrangement may be advantageous when the lengths of the discrete portion 26 change or when the diameters and speeds of the various rolls 32, 40 and 84 need to be changed. The offset arrangement also can be used when less vertical spacing is present between the first and second webs, 14 and 48, respectively.

The invention will be further described by way of the following theoretical example.

EXAMPLE 1

Calculations were completed using a rotary cutter 28, a vacuum anvil roll 32 and a servo-driven vacuum transfer roll 40 arranged according to the schematic depicted in FIG. 1 to produce a disposable absorbent article. Even though this example is a theoretical model, it does outline the steps one should follow to build a prototype. The size, shape and construction of the disposable absorbent article as well as the diameters, nips and gaps of the various rolls can be sized to accommodate the particular article that one desires to manufacture. The circumference of the rotary cutter 28, the anvil roll 32, and the transfer roll 40 could be selected to be about 30 inches (about 762 mm). The rotary cutter 28 could be made of steel and have a single knife 30 secured to its outer periphery. The knife 30 can have a cutting blade with a width of about 6 inches (about 152.4 mm). The knife 30 can be constructed from M2 tool steel that is commercially available from Kinetic Co. Inc. having an office at 6775 W. Loomis Road, Greendale, Wis. 53129-0200. The anvil roll 32 can be a solid roll constructed from D2 tool steel. Alternatively, the anvil roll 32 can be a constructed roll having a wall thickness sufficiently strong to withstand the accepted deflection forces. The constructed roll can allow an easier way to add vacuum to the roll. The surface of the construction roll should be made of D2 tool steel. The transfer roll 40 should be constructed of polycarbonate or lightweight plastic materials. These materials are commercially available from Cadillac Plastic & Chemical Co. having an office at 2803 Packerland Drive, Suite 17, Green Bay, Wis. 54313.

The vacuum in both of the anvil roll 32 and in the transfer roll 40 should be approximately 20 inches of water (approximately 508 mm of water). A 3,000 to 4,000 revolutions per minute (rpm) servomotor 44 with a torque capability of about 33 footpounds could be selected to power the servo-driven transfer roll 40. The servomotor 44 can be purchased from Indramat, a Division of The Rexroth Corporation having an office at 5150 Prairie Stone Parkway, Hoffman Estates, Ill. 60192-3707. The servomotor 44 can be connected to a 3 to 1 low inertia gear box. Such a gearbox is commercially available from Wisconsin Bearing, a Division of Motion Industries having an office at 565 Enterprise Drive, Neenah, Wis. 54956.

The transfer roll 40 is a vacuum roll that can be driven by the servomotor 44. The transfer roll 40 could be made from various lightweight materials, including a composite of aluminum, steel and engineered plastics. The surface of the vacuum transfer roll 40 could be coated, if desired, and finished to have a predetermined surface roughness. The gap 42 formed between the anvil roll 32 and the transfer roll 40 could be sized to be from between about 0.125 inches to about 0.188 inches (about 3.17 mm to about 4.77 mm) so as to allow the discrete portion 26 to easily pass therebetween. The exact dimension of the gap 64 will depend upon the material that is being transferred, the size of the transfer roll 40, the rotational speed of the transfer roll 40 and the dimensions of the discrete portion 26, as well as other factors.

A first web 14 of high loft, airlaid material can be fed horizontally through the nip 18 formed between the pair of feed rolls 20 and 22. The first web 14 would be advanced through the gap 34 formed between the rotary cutter 28 and the vacuum anvil roll 32. The discrete portions 26 can be individually cut from the first web 14 and be transferred onto the vacuum anvil roll 32. The transfer of the discreet portions 26 can occur at the speed of the first web 14. Each discrete portion 26 can be conveyed clockwise around the vacuum anvil roll 32 to the gap 42. At the gap 42 each discrete portion 26 can be transferred onto the outer surface of the servo-driven, transfer roll 40. While on the outer surface of the transfer roll 40, each discrete portion 26 can be rotated counterclockwise and the speed of the transfer roll 40 can be changed to match the speed of the second web 48. The speed of the second web 48 can be controlled by the feed mechanism 68. The second web 48 can be made of polypropylene spunbond and can be fed into the gap 64 at a speed of about 217 inches per second (about 5,512 mm/sec.)

The discrete portion 26, after being cut, can be passed from the anvil roll 32 to the transfer roll 40. The anvil roll 32 and transfer roll 40 are set up with a minimal gap 42 therebetween to allow the passage of the discrete portion 26 from the anvil roll 32 to the transfer roll 40. At a point between the transfer roll 40 and the backing roll 66, the discrete portion 26 can be brought into contact with the second web 48 and the discrete portion 26 can be adhered to the second web 48. The backing roll 66 will assure that the discrete portion 26 is firmly attached or positioned on the second web 48 to form the combination web 76.

It should be noted that the discrete portion 26 can be cut out of the first web 14 so as to have a desired length and width, for example, a length of about 12 inches (about 305 mm) and a width of about 2 inches (about 51 mm). To produce about 325 discrete portions per minute (about 5.4 products per second, or one discrete portion every 0.18 seconds), the speed of the incoming first web 14 can be regulated at about 3,900 inches per minute (about 9,906 cm/min.). It is desirable to cut one discrete portion 26 per each rotation of the rotary cutter 28. The rotary cutter 28 can rotate at 325 rpm which, in turn, requires the surface speed of the rotary cutter 28 and the anvil roll 32 to be about 9,750 inches/minute (about 24,765 cm/min.).

In Example 1, the first web 14 can be directed into the gap 34 where the discrete portion 26 will be cut from the first web 14 by the rotary cutter 28 cooperating with the anvil roll 32. As the discrete portion 26 is being cut or immediately after being cut, it is transferred onto the outer circumference of the anvil roll 32, which is rotating at the speed of the rotary cutter 28. To correct for any mismatch in speeds between the rotary cutter 28 and the anvil roll 32, while the discrete portion 26 is in contact with both, the discrete portion 26 is allowed to slip over the outer surface of the anvil roll 32. After the discrete portion 26 has been released from the rotary cutter 28 and has been transferred onto the outer surface of the anvil roll 32, the speed of the discrete portion 26 will match the speed of the anvil roll 32.

The discrete portion 26 is carried by the anvil roll 32 and is transferred to the servo-driven transfer roll 40. As soon as at least half the length of the discrete portion 26 has been transferred onto the surface of the transfer roll 40, the transfer roll 40 is accelerated and then decelerated to a constant speed of about 13,020 inches/minute (about 33,070 cm/min.). This represents the same speed at which the second web 48 is traveling. The discrete portion 26 is transferred from the servo-driven transfer roll 40 to the second web 48 and firmly pressed in place by the backing roll 66. The pressure at the nip point between the servo-driven transfer roll 40 and the backing roll 66 is about five pounds per linear inch.

While the invention has been described in conjunction with several specific embodiments, it is to be understood that many alternatives, modifications and variations will be apparent to those skilled in the art in light of the aforegoing description. Accordingly, this invention is intended to embrace all such alternatives, modifications and variations that fall within the spirit and scope of the appended claims.

We claim:

1. An apparatus for transferring a discrete portion of a first web traveling at a first speed onto a second web traveling a second speed, comprising:

a) a converting mechanism capable of forming at least one discrete portion out of said first web;

b) an anvil roll positioned in close proximity to said converting mechanism and traveling at a rotational speed at least equal to said first speed, said anvil roll being a vacuum roll which is capable of directing said discrete portion away from said converting mechanism;

c) a transfer roll positioned in close proximity to said anvil roll and initially traveling at a rotational speed equal to said rotational speed of said anvil roll, said transfer roll forming a gap with said anvil roll through which said discrete portion can pass, said transfer roll being a vacuum roll which is capable of directing said discrete portion away from said anvil roll and said transfer roll being capable of changing rotational speed to match said second speed during a single revolution; and d) a backing roll positioned in close proximity to said transfer roll and traveling at a rotational speed equal to said second speed, said backing roll cooperating with said transfer roll to combine said discrete portion with said second web.

2. The apparatus of claim 1 wherein said transfer roll is driven by a servomotor via a connector.

3. The apparatus of claim 2 wherein a gearbox is positioned across said connector to change torque output between said servomotor and said transfer roll.

4. The apparatus of claim 2 wherein said servomotor is capable accelerating and decelerating said transfer roll within a single revolution of said transfer roll.

5. The apparatus of claim 1 wherein said first speed is different from said second speed.

6. The apparatus of claim 1 wherein said first speed is equal to said second speed.

7. The apparatus of claim 1 wherein said anvil roll and said transfer roll have equal diameters.

8. The apparatus of claim 1 wherein said transfer roll has a larger diameter than said backing roll.

9. The apparatus of claim 1 wherein said converting mechanism is a rotary cutter.

10. An apparatus for transferring a discrete portion of a first web traveling at a first speed onto a second web traveling at a second speed, comprising:

a) a rotary cutter capable of forming at least one discrete portion out of said first web;

b) an anvil roll positioned in close proximity to said rotary cutter and traveling at a rotational speed greater than said first speed, said anvil roll being a vacuum roll which is capable of directing said discrete portion away from said rotary cutter;

c) a transfer roll positioned in close proximity to said anvil roll and initially traveling at a rotational speed equal to said rotational speed of said anvil roll, said transfer roll forming a gap with said anvil roll through which said discrete portion can pass, said transfer roll being a vacuum roll which is capable of directing said discrete portion away from said anvil roll and said transfer roll being capable of changing rotational speed to match said second speed during a single revolution; and d) a backing roll positioned in close proximity to said transfer roll and traveling at a rotational speed equal to said second speed, said backing roll cooperating with said transfer roll to combine said discrete portion with said second web.

11. The apparatus of claim 10 wherein said rotary cutter has an outer circumference with a single knife secured thereto.

12. The apparatus of claim 10 wherein said rotary cutter, said anvil roll and said transfer roll all have the same diameter.

13. The apparatus of claim 10 wherein said transfer roll has a larger diameter than said backing roll.

14. The apparatus of claim 10 wherein said backing roll is a stomper roll having at least one protruding section.

* * * * *